United States Patent Office 2,727,042
Patented Dec. 13, 1955

2,727,042

DIASTEREOISOMERIC OXAZOLINES AND PROCESSES FOR THEIR PREPARATION

Robert Michel Jacob, Ablon-sur-Seine, France, assignor, by mesne assignments, to Parke, Davis & Company, Detroit, Mich., a corporation of Michigan No Drawing. Application April 16, 1951,
Serial No. 221,335

Claims priority, application France December 4, 1950

7 Claims. (Cl. 260—307)

The present invention relates to new diastereoisomeric oxazolines and to processes for their preparation. This application is a continuation-in-part of application Serial No. 212,482 filed February 23, 1951.

By analogy with the nomenclature adopted by Rebstock et al. (J. A. C. S., vol. 71, pp. 2458–2473) in connection with the diastereoisomeric amido diol, 2-dichloracetamido-1-p-nitrophenylpropane 1:3-diol, an optically active isomer of which is known by the common name "chloramphenicol," structural isomeric forms are herein referred to as "erythro" and "threo" respectively while the racemic mixture and individual structural isomeric forms are designated DL, L and D respectively.

The oxazolines of the present invention are the racemic and optically active forms of threo 2-dichloromethyl-4-chloromethyl-5-p-nitrophenyl-Δ²-oxazoline which conforms to the conventional formula:

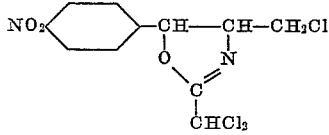

threo 2-dichloracetamido - 1 - p-nitrophenyl-1:3-dichloropropane in the cold with a dilute solution of an alkali metal hydroxide such as sodium or potassium hydroxide. By "in the cold" we mean a temperature not in excess of 40° C. and preferably room temperature. The starting material, the said dichloropropane, can be prepared for example by one of the methods described in the specification of copending application No. 221,336. Preferably, the tetrachloro compound is prepared by heating an erythro form of 2-dichloromethyl-4-p-nitrophenylhydroxymethyl-Δ²-oxazoline with thionyl chloride under reflux.

The threo 2-dichloromethyl-4-chloromethyl-5-p-nitrophenyl-Δ²-oxazolines are important intermediates for the synthesis of antibiotics. This is accomplished by treating the products of the present invention with dilute hydrochloric acid followed by neutralization to produce the threo-2-dichloracetamido - 1 - p-nitrophenyl-3-chloropropane-1-ol and reacting the latter compound with aqueous alkali to obtain the threo-2-dichloromethyl-4-hydroxymethyl-5-p-nitrophenyl-Δ²-oxazolines which possess antibiotic properties. These latter oxazolines can be converted by hydrolysis to the threo-1-p-nitrophenyl-2-dichloracetamidopropane-1,3-diols, the D-(—) isomer of the latter product being known as chloramphenicol.

The following non-limitative examples illustrate the present invention.

*Example I*

3.5 g. of DL-threo 2-dichloracetamido-1-p-nitrophenyl-1:3-dichloropropane (M. P. 135° to 137° C.) is dissolved in 40 c. c. of ethanol. At room temperature and with agitation there is then added over a period of 30 minutes 10 c. c. of a normal caustic soda solution. The reaction mixture is then neutralised to phenolphthalein by the addition of 0.3 c. c. of a normal sulphuric acid solution and is allowed to crystallise in a refrigerator. The precipitate is filtered off, washed with absolute alcohol and dried in vacuo. In this way, there are obtained 2.3 g. of DL-threo 2-dichloromethyl-4-chloromethyl-5-p-nitrophenyl-Δ²-oxazoline of M. P. 93.5° to 96° C. which after recrystallisation from ethanol melts at 94.5° to 97° C.

*Example II*

5.0 g. of D-threo 2-dichloracetamido-1-p-nitrophenyl-1:3-dichloropropane (M. P.=151° C. and $(\alpha)_D^{21}=-10°$ (c=6% in ethyl acetate)) is dissolved in 65 c. c. of ethanol and over a period of 20 minutes 13.9 c. c. of a normal caustic soda solution are added. After being allowed to stand for one hour at room temperature, the reaction mixture is diluted with water and extracted with ether. From the ethereal extract and after evaporation of the solvent there is obtained 3.9 g. of D-threo 2-dichloromethyl - 4 - chloromethyl-5-p-nitrophenyl-Δ²-oxazoline in the form of an oil: $(\alpha)_D^{20}=+17.3°$ (c=5% in ethyl acetate).

We claim:
1. The threo forms of 2-dichloromethyl-4-chloromethyl-5-p-nitrophenyl-Δ²-oxazoline.
2. DL-threo 2 - dichloromethyl-4-chloromethyl-5-p-nitrophenyl-Δ²-oxazoline.
3. D-threo 2-dichloromethyl-4-chloromethyl-5-p-nitrophenyl-Δ²-oxazoline.
4. A process for the preparation of DL-threo 2-dichloromethyl - 4 - chloromethyl-5-p-nitrophenyl-Δ²-oxazoline which comprises the cyclization of DL-threo 2-dichloracetamido-1-p-nitrophenyl - 1,3 - dichloropropane by treatment with a dilute aqueous solution of an alkali metal hydroxide at a temperature not over 40° C.
5. A process for the preparation of D-threo 2-dichloromethyl - 4 - chloromethyl - 5 - p - nitrophenyl-Δ²-oxazoline which comprises the cyclization of D-threo 2-dichloracetamido-1-p-nitrophenyl-1,3-dichloropropane by treatment with a dilute aqueous solution of an alkali metal hydroxide.
6. A process according to claim 4 wherein the dichloropropane compound is dissolved in ethanol and sodium hydroxide is added at about room temperature.
7. A process according to claim 5 wherein the dichloropropane compound is dissolved in ethanol and sodium hydroxide is added at about room temperature.

References Cited in the file of this patent

UNITED STATES PATENTS

| | | |
|---|---|---|
| 2,114,326 | Adams et al. | Apr. 9, 1938 |
| 2,513,346 | Moersch et al. | July 4, 1950 |
| 2,562,114 | Moersch et al. | July 24, 1951 |

OTHER REFERENCES

Wiley et al.: Chem. Reviews, vol. 44, June 1949, pp. 449–51.